(12) United States Patent
Marmo

(10) Patent No.: US 6,779,888 B2
(45) Date of Patent: Aug. 24, 2004

(54) CONTACT LENSES WITH MICROCHANNELS

(75) Inventor: J. Christopher Marmo, Danville, CA (US)

(73) Assignee: Ocular Sciences, Inc., Concord, CA (US)

(*) Notice: Subject to any disclaimer, the term of this patent is extended or adjusted under 35 U.S.C. 154(b) by 126 days.

(21) Appl. No.: 09/910,355

(22) Filed: Jul. 20, 2001

(65) Prior Publication Data

US 2002/0021409 A1 Feb. 21, 2002

Related U.S. Application Data

(60) Provisional application No. 60/221,575, filed on Jul. 28, 2000.

(51) Int. Cl.[7] .................................................. G02C 7/04
(52) U.S. Cl. .............................. 351/160 R; 351/160 H
(58) Field of Search ....................... 351/160 R, 160 H, 351/161–162

(56) References Cited

U.S. PATENT DOCUMENTS

| | | | |
|---|---|---|---|
| 2,393,266 A | 1/1946 | Riddell | 351/160 R |
| 2,989,894 A | 6/1961 | Gordon | 351/160 R |
| 3,228,741 A | 1/1966 | Becker | 351/160 R |
| 3,246,941 A | 4/1966 | Moss | 351/160 R |
| 3,431,046 A | 3/1969 | Conrad et al. | 351/160 R |
| 4,353,849 A | 10/1982 | Lewison | 264/2.7 |
| 4,401,371 A | 8/1983 | Neefe | 351/160 R |
| 4,890,911 A | 1/1990 | Sulc et al. | 351/160 H |
| 5,009,497 A | 4/1991 | Cohen | 351/161 |
| 5,104,213 A | 4/1992 | Wolfson | 351/160 R |
| 5,166,710 A | 11/1992 | Höfer et al. | 351/160 R |
| 5,347,326 A | 9/1994 | Volk | 351/160 R |
| 5,483,304 A | * 1/1996 | Porat | 351/161 |
| 5,598,233 A | 1/1997 | Haralambopoulos et al. | 351/160 H |
| 5,849,811 A | 12/1998 | Nicolson et al. | 523/106 |

FOREIGN PATENT DOCUMENTS

DE 2546692 4/1977

\* cited by examiner

Primary Examiner—Jordan M. Schwartz
(74) Attorney, Agent, or Firm—Stout, Uxa, Buyan & Mullins, LLP; Frank J. Uxa; Greg S. Hollrigel

(57) ABSTRACT

Contact lenses for use in eyes are provided and include a lens body and a plurality of radially extending microchannels defined in the posterior face of the lens body. In one embodiment, the microchannels are sized and adapted to promote effective tear fluid exchange between an exposed surface of the eye and a surface of the eye covered by the lens body without substantially interfering with the optical zone function of the lens body.

47 Claims, 2 Drawing Sheets

CONTACT LENSES WITH MICROCHANNELS

CROSS REFERENCE TO RELATED APPLICATION

This application claims the benefit of U.S. Provisional Application No. 60/221,575, filed Jul. 28, 2000 and entitled CONTACT LENSES WITH MICROCHANNELS.

BACKGROUND OF THE INVENTION

The present invention generally relates to contact lenses and more specifically relates to contact lenses having microchannels that promote effective tear fluid exchange.

It has long been recognized that extended wear of contact lenses can lead to corneal complications. Adverse corneal responses to extended contact lens wear are believed to be primarily caused by accumulation of debris trapped at the lens-eye interface.

The cornea is a living tissue with an active metabolism. Waste products, for example lactic acid, carbon dioxide and water, generated by such metabolism must be expelled from the cornea. Contact lens wear results in debris, for example, derived from such waste products, dead epithelial cells, and other materials which are ordinarily removed from the eye, becoming trapped at the lens-eye interface. Such debris, if left to accumulate in the eye, can harm the eye, for example, causing irritation and/or other harm to the eye and/or to the general ocular health of the lens wearer. In order to remain healthy, the cornea must receive an adequate supply of oxygen as the cornea does not receive oxygen from the blood supply as does other living tissue. If sufficient oxygen does not reach the cornea, corneal swelling occurs.

In order to address the problem of oxygen deprivation due to extended wear of contact lenses, hydrophilic lenses with high oxygen transmission properties were developed. Hydrophilic lenses, also sometimes referred to as hydrogel lenses, are soft, flexible water-containing lenses. Clinical studies of hydrophilic lenses have indeed shown a relatively lower degree of corneal swelling in persons wearing such lenses, even when worn over an extended time.

Unfortunately, however, the use of conventional hydrophilic lenses have not eliminated all adverse corneal responses to contact lens wear, in particular extended contact lens wear. For example, conventional hydrophilic lenses do not address the problem of debris accumulation at the lens-eye interface. This suggests that in addition to oxygen permeability, there are other considerations to be addressed in the development of a safe, soft contact lens for extended wear.

One important consideration is effective tear film exchange between the exposed surface of the eye and the surface of the eye covered by the lens. Tear fluids provide for hydration of delicate eye tissue and continuous flushing of debris from the eye. Tear film exchange between the eye and the posterior, i.e. eye facing, surface of a contact lens, is believed to be a critical factor in maintaining eye health. Tear film exchange allows for removal of dead epithelial cells, foreign particulate matter and other debris that may otherwise become trapped between the lens and the eye. It has been hypothesized that increased tear film exchange will not only enhance corneal health but will limit complications such as infection in the eye and microbial keratisis.

Rotation of the lens on the eye has long been recognized as a means of maintaining eye health and comfort. For example, Gordon U.S. Pat. No. 2,989,894 describes a contact lens having five equally spaced, spirally inclined ducts formed on an inner surface of the lens. Each duct is described and shown as extending toward a center of the lens but without extending as far as the corneal region. It is stated that the slow and constant rotation of the lens prevents excess settling of the lens on the cornea. The spiral inclination of the ducts is said to cause the lens to rotate in a clockwise or counterclockwise direction depending upon the direction of inclination.

More recently, Höfer et al U.S. Pat. No. 5,166,710 discloses a contact lens having a corneal region that, when placed on the eye, is spaced apart from the corneal surface. Provision is made for causing the lens to rotate upon eye lid blinking action of the wearer. According to Höfer et al, lacrimal film is transported along the eye surface as a result of a "turbo effect" produced by flattened zones on the lens, which causes the lens to rotate on the eye in response to blinking action. The patent also describes that tear transport may be provided by depressions in the rear face of the lens body. Höfer et al shows and describes that the depressions may be depressed portions of the lens body, within the rear surface thereof, the depressions being groove-like or saw tooth-like in shape. Höfer et al describes that it is also possible to provide "thin wave-like curved channels".

Nicolson et al U.S. Pat. No. 5,849,811 discloses a lens material that was developed to provide a balance of oxygen permeability with ion or water permeability, with the permeability being sufficient to provide contact lens "eye-on movement", i.e. movement of the lens on the eye surface.

Each of the patents identified herein is hereby incorporated in its entirety herein by reference.

Despite the advances made in development of comfortable, safe, extended wear contact lenses, there is still a need for an improved contact lens, for example, a lens that promotes tear fluid exchange throughout the surface area of the eye, particularly in the area of the cornea. In addition, there still remains a need for contact lenses which provide enhanced tear fluid exchange.

SUMMARY OF THE INVENTION

It has been found that exchange of tear fluid or film from outside the periphery of the lens with tear fluid or film disposed behind the lens, that is between the lens and the eye or at the lens-eye interface, provides for enhanced removal of debris from the lens-eye interface. Such debris removal can result in enhanced ocular health and/or long periods of extended contact lens wear with reduced adverse corneal responses. Enhanced debris removal in accordance with the present invention is particularly useful in combination with contact lenses having high oxygen permeability, such as hydrophilic contact lenses, for example, contact lenses made of hydrophilic polymeric materials, silicone hydrogel materials and the like. A contact lens with effective tear fluid or film exchange, as defined herein, has, generally speaking, substantial positive effect on ocular health. Preferably, the present contact lenses, which are structured and adapted to provide such effective tear fluid or film exchange, have a more significant positive effect on corneal health than a similar contact lens that does not provide effective tear fluid or film exchange.

Contact lenses, for example, extended wear contact lenses, in accordance with the present invention, provide for removal of debris from beneath the contact lens through effective tear fluid or film exchange; provide increased delivery of oxygen to the cornea; and preferably do not depend upon rotation of the lens for promoting the effectiveness of tear fluid or film exchange. The present lenses promote corneal health without significantly adversely effecting wearer comfort or vision. The present contact lenses promote corneal health and wearer comfort and can be economically manufactured using conventional and well known contact lens manufacturing techniques such as, for example, cast molding techniques, machining techniques and the like.

In one broad aspect of the present invention, contact lenses comprise a lens body having a posterior face (as well as a generally opposing anterior face), an optical zone, a peripheral portion, a peripheral edge and a plurality of microchannels as described herein. In one useful embodiment, the microchannels are defined in the posterior face of the lens body, i.e. the surface of the lens that faces the eye surface when the lens is being worn on the eye. The present lenses are particularly adapted as extended wear contact lens, that is lenses which can be worn for a time in a range of about 7 days to about 30 days or more without being removed from the eye. Lenses in accordance with the present invention preferably can be safely and comfortably worn without being removed from the eye for a longer period of time relative to a substantially identical lens without the microchannels.

Advantageously, despite the preferably relatively large number of microchannels in the contact lens of the present invention, the structure and arrangement of the microchannels have substantially no adverse effect on optical zone function, that is on the vision correction ability or property of the optical zone. Thus, the wearer of the present contact lens, with the microchannels as described herein, has substantially the same or better vision quality relative to the same wearer wearing a similar or substantially identical contact lens without the microchannels.

When compared to the channels and ducts in earlier or prior contact lenses, the microchannels in the contact lenses in accordance with the present invention preferably are relatively small in size. For example, each microchannel in accordance with the present invention may have a width of less than about 10 degrees or less than about 5 degrees, and more preferably in a range of about 0.5 degree to about 2 degrees (for example, in a 360 degree substantially circular array).

Each microchannel may be defined by a continuous, substantially non-variable, angular ray extending theoretically from about a periphery of the optical zone of the lens to about an outer periphery of the lens. Preferably, each microchannel has a maximum width in a range of between about 50 to about 500 microns.

Each microchannel may have a maximum depth in a range of about 0.1% to about 90%, more preferably about 10% to about 80%, of the lens thickness. Many contact lenses in accordance with the present invention have lens bodies with thicknesses in the range of about 60 microns to about 90 microns or about 100 microns or about 120 microns.

In an advantageous embodiment, the microchannels are preferably tapered in depth and/or width, with maximum depth and/or width at or about the lens periphery. In other words, the microchannels preferably increase in depth and/or width in a radially outward direction relative to the lens center. The microchannels preferably are substantially straight, rather than curved or wavelike, in form.

A contact lens in accordance with the invention preferably has at least about 5 microchannels, and more preferably, about 10 or about 12 to about 100 or about 200 microchannels. The number of microchannels often depends on the width of the individual microchannels, the spacing between the microchannels and the like factors.

The structure of the lens of the present invention, and in particular, the structure and number of the microchannels, promotes or facilitates a substantially consistent or uniform film of tear fluid between the lens and the eye, that is at the lens-eye interface, and a substantially free flowing tear film at the lens-eye interface. Such substantially consistent or uniform tear fluid film and/or substantially free flowing tear film at the lens-eye interface advantageously facilitates tear fluid exchange between the lens-eye interface and the exposed surfaces of the eye.

As used herein, "free flowing tear film" refers to the degree of flow or movement of a tear film which is located on a normal mammalian eye, preferably a normal human eye, not associated with a contact lens. A "substantially free flowing tear film" refers to a degree of flow or movement of a tear film which is at least about 50% or at least about 70% or at least about 80% of the degree of flow or movement of a free flowing tear film.

Because of the relatively large number and/or even distribution of individual microchannels, fluid exchange preferably occurs substantially evenly over the posterior surface of the lens. In effect, the design of the contact lens in accordance with the invention preferably provides for a substantially free flowing film of tear fluid between the contact lens and the eye. When the lens is worn for an extended period of time, the film is continually mixed with tear fluid from other parts of the eye outside the lens periphery. Mixing the tear film from the lens-eye interface, which often contains a substantial amount of debris, with "clean" tear film reduces the debris concentration and thereby allows the lens to be worn for a longer period of time before removal from the eye and/or has an advantageous effect on the ocular health of the lens wearer.

Without wishing to limit the invention to any particular theory of operation, it is believed that the present microchannels facilitate increased tear film exchange by allowing movement of tear fluid from the interior portion of the lens-eye interface to the periphery of the lens and beyond. Upon blinking, the eye lid is believed to exert shear and/or compressive forces on the lens causing displacement and mixing of tear fluid via the microchannels.

In one especially advantageous embodiment of the invention, the plurality of microchannels radiate from the outer edge of the lens optical zone through the peripheral portion of the lens. In this embodiment, the microchannels preferably are dimensioned to be widest and/or deepest, and most distantly spaced apart, at the peripheral edge of the lens. The microchannels run inwardly toward the center of the lens and are most closely spaced together at or about the edge of the optical zone.

In one embodiment, the optical zone preferably is free of microchannels to provide for substantially no interference with the optical zone function or vision correction function of the lens. The optical zone may be disposed somewhat anteriorly, relative to the peripheral portion of the lens, particularly in areas defined between the microchannels. In other words, the optical zone of the lens may be structured to be more distantly spaced apart from the eye relative to the peripheral portion when the lens is being worn on an eye. This anteriorly extending optical zone, combined with the present microchannels, for example, in the peripheral portion of the lens, very effectively provides for useful tear fluid exchange.

In accordance with another feature of the invention, at some of the plurality of microchannels may be extended at least partially into the optical zone, as long as the arrangement of microchannels does not cause substantial interference with vision correction or optical zone function. For example, the arrangement of microchannels may include alternating long and short microchannels with the long microchannels being defined as those that extend into the lens optical zone, and the short microchannels being those that extend from a periphery of the optical zone. The plurality of microchannels may be arranged such that several of the microchannels extend from the center of the lens to the peripheral edge of the lens body edge.

The contact lens in accordance with the invention may include a first set of microchannels within the optical zone and a second set of microchannels within the peripheral portion. The first set of microchannels may have relatively fewer microchannels than the second set of microchannels. The first set and second set may be in fluid communication with each other, for example, by means of an annular microchannel between the first and second sets of microchannels.

The microchannels in the present contact lenses can be provided using any suitable technique or processing or combinations thereof. Preferably, such microchannels are provided during contact lens manufacture using techniques which are conventional and well known in the art. For example, there are at least three opportunities in the process of making contact lens that microchannels can be imparted. These are as follows:

- etching the molding insert using etching techniques such as chemical, laser, EDM, photolithograph, UV irradiation, micromachining and the like;
- building a relief on a thermoplastic mold using techniques such as microcontact printing and the like; and
- imparting the microchannels directly on a lens, such as by lasing (preferred) and the like.

Each and every feature described herein, and each and every combination of two or more of such features, is included within the scope of the present invention provided that the features included in such a combination are not mutually inconsistent.

These and other aspects of the present invention are set forth in the following detailed description, examples and claims, particularly when considered in conjunction with the accompanying drawings in which like parts bear like reference numerals.

DETAILED DESCRIPTION

Figure 1:
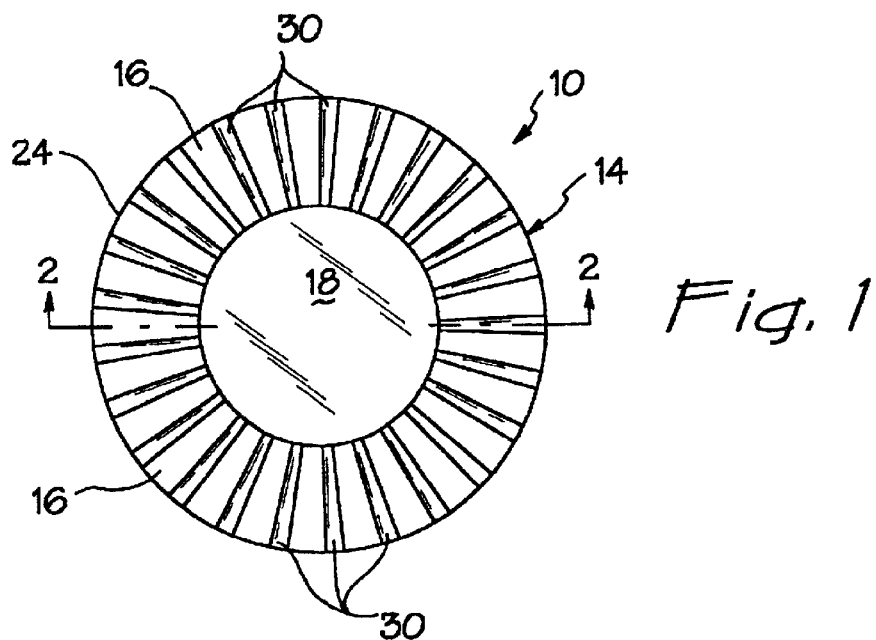
FIG. 1 is a plan view of a posterior face of a contact lens in accordance with the present invention.
Figure 2:
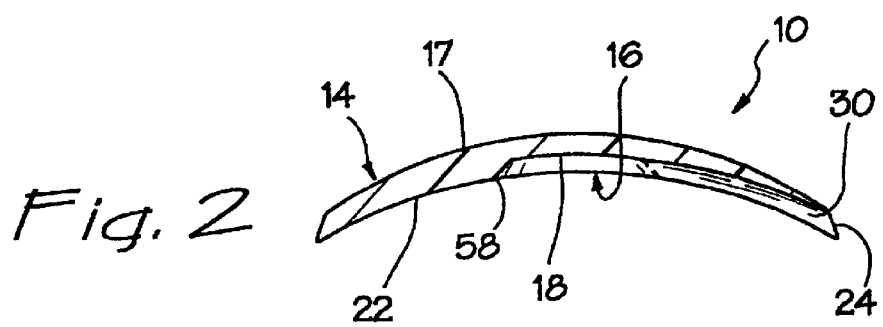
FIG. 2 is a cross sectional view taken generally along line 2—2 of FIG. 1.
Figure 3:
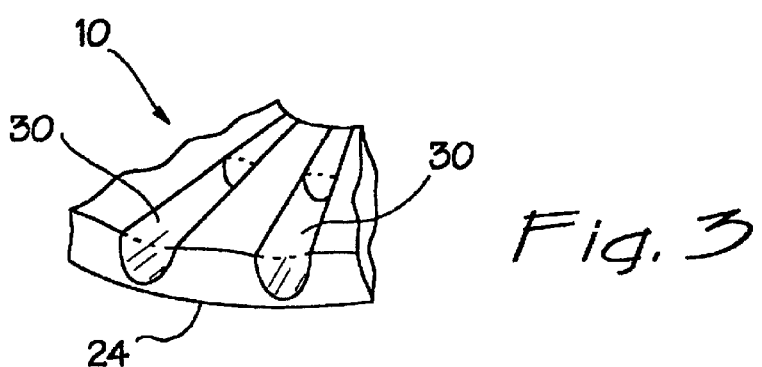
FIG. 3 is a partial perspective view of the contact lens of FIG. 1 showing two of the microchannels in detail.

Turning now to FIGS. 1, 2 and 3, a contact lens 10 in accordance with the invention is shown. Contact lens 10 includes a lens body 14 with a posterior face 16 and an opposing anterior face 17. The posterior face 16 includes an optical zone 18 configured for vision correction, and a peripheral portion 22 generally surrounding the optical zone 18, and a peripheral edge 24. The posterior face 16, as used herein refers to the surface of the lens which faces toward the eye during wear. The posterior face 16, which is typically concave, is sometimes referred to as the base curve of the lens.

The lenses in accordance with the present invention can be manufactured by using any suitable manufacturing technique or combination thereof. Many such techniques or processes are conventional and/or well known in the art. Such processes include, for example, turning, laser-machining, swaging, injection moulding, casting (semi-mould, full mould) and the like and combinations thereof.

The lenses in accordance with the invention may be "hard" or "rigid" lenses, flexible or soft silicone lenses, soft hydrophilic lenses and the like. The present lenses are particularly adapted for extended wear lens, for example, lenses which can be worn from about 1 day to about 14 days or more without removal or, disposable lenses. Materials which are suitable for use in the present lenses include, without limitation, conventional hydrogel materials, for example, hydroxyethyl methacrylate-based materials, silicone-hydrogel materials, gas permeable materials, lens materials described in Nicolson et al U.S. Pat. No. 5,849,811, other ophthalmically compatible lens materials, for example, which are well known to those skilled in the art, and the like and combinations thereof.

Importantly, the lens 10 further comprises a plurality of radially extending microchannels 30 defined in the posterior face 16 of the lens body 14. Advantageously, the microchannels 30 are sized and adapted to promote effective tear fluid exchange on the eye, as well as provide a substantially even or uniform distribution of tear film at the lens-eye interface.

As used herein, the term "microchannel" is used to describe a fine groove that preferably is less than 100 microns in depth or width. The microchannels 30 do not extend through the entire thickness of the lens body 14. For example, the microchannels 30 may extend through about 5% or about 10% to about 30% or about 50% or about 80% of the thickness of the lens body. The microchannels 30 often have a depth in a range of about 0.1 microns and about 50 microns. The microchannels 30 are defined substantially along radii of lens body 14. Each radially extending microchannel 30 is substantially wedge-shaped, in that it has a decreasing taper in terms of depth and width from the peripheral edge, or outer periphery 24 of the lens, toward the center of the optical zone 18.

Looked at from a different perspective, each microchannel 30 preferably has a maximum width, for example at about the periphery 24 of the lens. Preferably, the maximum width of each microchannel is in a range of about 50 microns or about 100 microns to about 400 microns or about 500 microns.

The plurality of microchannels comprise microchannels spaced apart by between about 5 degrees, or about 10 degrees, or about 30 degrees. The plurality of microchannels comprise between about 5 or about 10 to about 200 or more microchannels in the lens. More preferably, the microchannels comprise between about 10 and about 100 microchannels. The microchannels 30 in the lens 10 may be sufficiently numerous such that the plurality of microchannels occupy a significant portion of the area of the posterior face 16. For example, in accordance with the present invention, the plurality of microchannels 30 may occupy at least about 10% or about 20% to about 30% or about 50% or more of the portion of the posterior face 16 on which the microchannels are located. In effect, the microchannels 30 may be said to create or form a furrowed posterior face 16.

The contact lens 10 is structured to promote tear fluid exchange between an exposed surface of the eye, and a surface of the eye covered by the lens 10. The microchannels 30 are effective to promote or facilitate such tear fluid exchange and preferably create a substantially free flowing tear film in the lens eye interface.

The plurality of microchannels 30 preferably comprise about 10 to about 200 microchannels and, in one very useful embodiment, comprise about 72 microchannels.

In the embodiment shown in FIG. 1, each of the microchannels 30 is substantially equidistantly spaced apart, one from the other, by about 5 degrees.

The plurality of microchannels 30 may include microchannels that have a depth dependent upon the thickness of the lens 10 itself. For example, each microchannel may have a depth of between about 0.1% to about 90% of a thickness of the particular lens body. More preferably, each microchannel has a depth of between about 10% and about 80% of a thickness of the lens body. For typical contact lens thicknesses, the microchannels in accordance with the invention have a depth of between about 0.1 micron and about 50 microns.

In the embodiment shown in FIG. 1, the microchannels 30 extend only into the peripheral portion 16 of the lens 10 and there is an absence of microchannels in the optical zone 18.

In order to provide effective tear fluid exchange at the optical zone 18 in the absence of microchannels, the contact lens 10 may be structured such that the optical zone 18 of the lens is somewhat anteriorly disposed relative to the surrounding peripheral portion 22, specifically relative to the part or surface of peripheral portion 22 located between the microchannels 30.

This feature is best understood with reference to FIG. 2. As shown, the microchannel 30 is tapered and becomes increasingly more shallow (less deep) from the peripheral edge 24 toward the optical zone 18. The optical zone 18 is anteriorly disposed a distance substantially equal to the depth of the shallow most portion of the microchannel 30. More specifically, the optical zone may be anteriorly disposed about 20 microns or about 10 microns or about 5 microns or less, relative to the peripheral portion 22.

This anterior "set off" of the optical zone 18, together with the microchannels 30 facilitates effective tear exchange, for example, as described elsewhere herein. In addition, the absence of microchannels in the optical zone 18 reduces, or even substantially eliminates any detrimental effects that the microchannels 30 may have on the vision quality or optical zone function provided by contact lens 10.

For wearer comfort, the lens body 14 may be shaped in the region between the peripheral portion 22 and the optical zone 18 so that all corners 58 created by an elevation differential between the peripheral portion 22 and optical zone 18, are rounded and smooth.

FIG. 3 shows the microchannels 30 being tapered, having relatively large cross sectional areas, depths and widths at or about the lens periphery 24 and relatively smaller cross sectional areas, depths and widths in a direction toward the center of the lens. Eventually the microchannels 30 merge into the space directly posterior of the optical zone 18 (FIG. 2). In this embodiment, the tear film in the space directly posterior of the optical zone 18 has a substantially uniform thickness to promote effective optical imaging by the lens 10. The microchannels 30 are in fluid communication with the space directly posterior of optical zone 18 and are effective to provide the desired tear fluid exchange at the lens-eye interface substantially without interfering with the optical zone function or the vision quality of lens 10.

Figure 4:
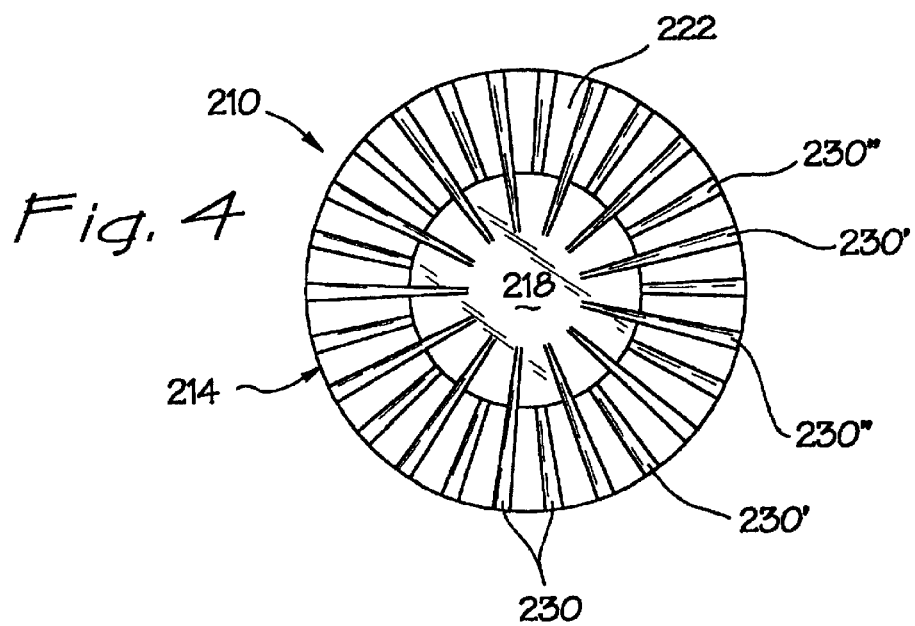
FIG. 4 is a plan view of a posterior face of an additional embodiment of a contact lens in accordance with the present invention.

FIG. 4 shows an additional contact lens 210 in accordance with the present invention. Except as expressly described, contact lens 210 is structured and functions similarly to contact lens 10. Components of lens 210 which correspond to components of lens 10 are identified by the same reference numeral increased by 200.

One of the primary differences between contact lens 210 and contact lens 10 relates to the positioning or orientation of optical zone 218. Specifically, optical zone 218 and peripheral portion 222 are on substantially the same curve. Put another way, optical zone 218 is not anteriorly set off relative to peripheral zone 222 (as is optical zone 18 anteriorly set off relative to peripheral portion 22).

In addition, a number of the microchannels 230 extend at least partially into the optical zone 218.

As shown in FIG. 4, the plurality of microchannels 230 include long microchannels 230' which extend into the optical zone 218, and alternating relatively short microchannels 230' which do not extend into the optical zone 218. This arrangement promotes transfer of lacrimal fluid between the space posterior of the optical zone 218 and the space posterior of the peripheral zone 222 of the lens 210 without substantially detrimentally affecting the optical zone function or functioning of the lens 210. It should be noted that the relatively long microchannels 230' are tapered substantially as described above with regard to the microchannels 30 so that the portion of these relatively long microchannels located in the optical zone 218 are relatively narrow and relatively shallow. Such narrow and shallow configuration of such microchannels in the optical zone 218 provides for effective tear fluid transfer without substantially detrimentally affecting the optical zone functioning of lens 210.

Figure 5:
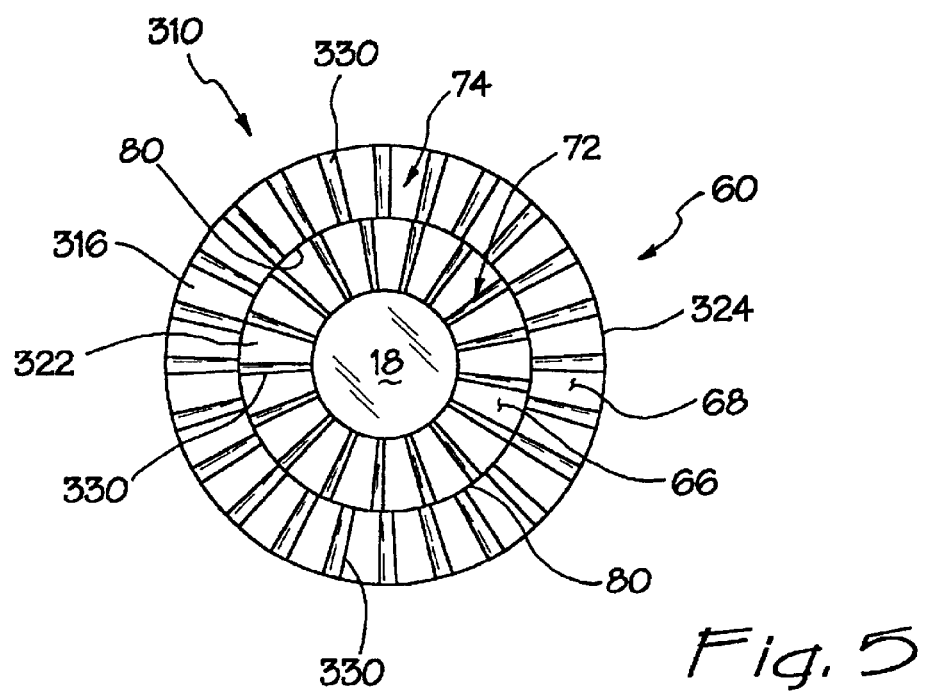
FIG. 5 is a plan view of a posterior face of another embodiment of a contact lens in accordance with the present invention.

FIG. 5 shows another contact lens 310 in accordance with the present invention. Except as expressly described, contact lens 310 is structured and functions similar to contact lens 10. Components of lens 310 which correspond to components of lens 10 are identified by the same reference numeral increased by 300.

One primary difference between lens 310 and lens 10 relates to the multiple sets of microchannels 330 present in lens body 314. Thus, the posterior face 316 of lens 310 includes a first annular portion 66 and a second annular portion 68 circumscribing the first annular portion with the peripheral edge 324 of the lens 310 circumscribing the second annular portion. A first set 72 of radially extending microchannels 330 is defined within the first annular portion 66 and a second set 74 of radially extending microchannels 330 is defined within the second annular portion 68. The first set 72 of microchannels 330 may be relatively fewer in number than the second set 74 of microchannels 330. Alternately, or additionally, the first set 72 of microchannels 330 may be relatively more shallow and/or relatively more narrow than the second set 74 of microchannels 330.

The lens 310 further comprises at least one substantially annular microchannel 80 defined between the first set 72 of microchannels 330 and the second set 74 of microchannels 330. This annular microchannel 80 provides fluid communication between the first and second sets 72 and 74 of microchannels 330, respectively. Thus, debris and/or metabolic waste products removal and tear fluid exchange can be easily achieved at the lens-eye interface. Also, because no microchannels extend into the optical zone 18 and relatively few microchannels extend into the inner portion of the peripheral portion, the optical zone functioning of lens 310 is substantially not interfered with because of the presence of the microchannels.

Lens 310 can be configured with or without the optical zone 318 being anteriorly offset relative to peripheral portion 322. In the event that no such anterior offset is provided, alternating microchannels 330 of the first set 72 may be made longer to extend into the optical zone 318. In any event, lens 310 is configured to provide for effective tear fluid exchange substantially without interfering with optical zone function of lens 310.

The present invention provides that tear fluid in the lens-eye interface is continually being transferred and/or mixed with tear fluid from beyond the peripheral edge of the contact lens. Moreover, because of the relatively large number of closely spaced microchannels, the arrangement of microchannels in accordance with the present invention provides for a substantially even or uniform distribution of tear fluid at the lens-eye interface. This substantially uniform distribution of tear fluid preferably forms a substantially continuous, free flowing tear film across the surface of the eye, that is, continually passing through the present microchannels to provide for effective tear fluid exchange or transfer. Dry areas at the lens-eye interface are substantially prevented. Moreover, any debris or metabolic waste products that may become trapped beneath the lens when the lens is initially placed upon the eye or which are formed during lens wear are effectively removed or transferred, along with the transfer of the tear fluid, away from the lens-eye interface. Advantageously, such material does not become trapped within the microchannels due to the shallow depth thereof.

While this invention has been described with respect to various specific examples and embodiments, it is to be understood that the invention is not limited thereto and that it can be variously practiced within the scope of the following claims.

What is claimed is:

1. A contact lens for use on an eye, the lens comprising:
   a lens body having a posterior face, an anterior face spaced apart by a distance from the posterior face and configured to accommodate movement of an eyelid over the entire anterior face of the lens body when the contact lens is placed on an eye, a thickness defined as the distance between the posterior face and the anterior face, a central optical zone, a curved peripheral portion of the posterior face surrounding the optical zone, and an outermost perimeter defining a circular curve;
   a plurality of radially extending microchannels defined in the posterior face of the lens body and having a depth less than about 90% of the thickness and a maximum width less than about 500 microns, the radially extending microchannels extending from a peripheral edge of the lens body through at least a substantial portion of the curved peripheral portion, the microchannels sized and adapted to promote effective tear fluid exchange between an exposed surface of the eye and a surface of the eye covered by the lens body.

2. The lens of claim 1 wherein the plurality of microchannels extend across the peripheral portion with an absence of microchannels within the optical zone.

3. The lens of claim 1 wherein the plurality of microchannels have a decreasing taper in terms of at least one of a width and a depth of the plurality of microchannels.

4. The lens of claim 1 wherein the plurality of microchannels are substantially equidistantly spaced apart and are sized and arranged to promote formation of a substantially continuous tear film between a lens-eye interface.

5. The lens of claim 1 wherein the plurality of microchannels comprise about 5 to about 200 microchannels.

6. The lens of claim 1 wherein the plurality of microchannels comprise about 10 to about 100 microchannels.

7. The lens of claim 1 wherein the plurality of microchannels are equidistantly spaced apart.

8. The lens of claim 1 wherein the plurality of microchannels comprise microchannels spaced apart by between about 5 degrees and about 30 degrees.

9. The lens of claim 1 wherein the plurality of microchannels comprise microchannels having a width of less than about 5 degrees.

10. The lens of claim 1 wherein the plurality of microchannels comprise microchannels having a width in a range of about 0.5 degrees to about 2 degrees.

11. The lens of claim 1 wherein the plurality of microchannels comprise microchannels having a maximum width in a range of about 50 microns to about 500 microns.

12. The lens of claim 1 wherein the plurality of microchannels comprise about 10 to about 200 microchannels, each microchannel having a width of less than about 5 degrees and a depth of between about 0.1 microns and about 50 microns.

13. The lens of claim 1 wherein the microchannels have a maximum depth in a range of about 0.1% to about 90% of a thickness of the lens body.

14. The lens of claim 1 wherein the microchannels have a maximum depth in a range of about 10% to about 80% of a thickness of the lens body.

15. The lens of claim 1 wherein the plurality of microchannels include first microchannels which are defined only in the peripheral portion and second microchannels which are defined at least partially in the optical zone.

16. The lens of claim 15 wherein the second microchannels are longer than the first microchannels.

17. The lens of claim 1 wherein the plurality of microchannels include a first set of microchannels and a second set of microchannels, and the first set and second set are in fluid communication with one another.

18. The contact lens of claim 17 wherein the plurality of microchannels further include a substantially annular microchannel defined between the first set and the second set.

19. A contact lens for use on an eye, the lens comprising:
   a lens body having a posterior face including a first annular portion, a second annular portion circumscribing the first annular portion, and a peripheral edge circumscribing the second annular portion;
   a first set of microchannels defined within the first annular portion of the posterior face and having a depth less than about 90% of a thickness of the lens body and having a maximum width less than about 500 microns; and
   a second set of radially extending microchannels defined within the second annular portion of the posterior face and having a depth less than about 90% of the thickness of the lens body and having a maximum width less than about 500 microns, the radially extending microchannels extending from the peripheral edge of the lens body towards the first annular portion of the lens body, wherein the first set and the second set are in fluid communication with one another.

20. The lens of claim 19 wherein the first set of microchannels is radially extending.

21. The lens of claim 19 further comprising a substantially annular microchannel defined between the first set and the second set.

22. The contact lens of claim 19 wherein the first set of microchannels includes relatively fewer microchannels than the second set of microchannels.

23. The lens of claim 19 wherein the lens body includes an optical zone and the first set of microchannels extends outward from an edge of the optical zone toward the peripheral edge.

24. The lens of claim 23 wherein there is an absence of microchannels in the optical zone.

25. A contact lens for use on an eye, the lens comprising:
a lens body having a posterior face, an anterior face spaced apart by a distance from the posterior face and configured to accommodate movement of an eyelid over the entire anterior face of the lens body when the contact lens is placed on an eye, a thickness defined as the distance between the posterior face and the anterior face, an optically powered optical zone, an optical zone edge, a curved peripheral portion of the posterior face surrounding the optical zone, and an outermost perimeter defining a circular curve;
a plurality of microchannels extending substantially along radii of the peripheral portion and having a depth less than about 90% of the thickness of the lens body and having a maximum width less than about 500 microns, the plurality of microchannels extending from a peripheral edge of the lens body through at least a substantial portion of the curved peripheral portion of the lens body towards the optical zone, the plurality of microchannels being sized and adapted to promote effective tear fluid exchange between an exposed surface of the eye and a surface of the eye covered by the lens body.

26. The lens of claim 25 wherein the plurality of microchannels extend across the peripheral portion with an absence of microchannels within the optical zone.

27. The lens of claim 25 wherein the plurality of microchannels have a decreasing taper in terms of at least one of a width and a depth of the plurality of microchannels.

28. The lens of claim 25 wherein the plurality of microchannels have a decreasing taper in terms of at least one of a width and a depth of the plurality of microchannels toward a center of the optical zone.

29. The lens of claim 25 wherein the plurality of microchannels comprise equidistantly spaced apart microchannels, each microchannel having a width of less than about 5 degrees and a maximum depth in a range of about 0.1 microns to about 50 microns.

30. The lens of claim 25 wherein the plurality of microchannels comprise about 5 to about 200 microchannels.

31. The lens of claim 25 wherein the microchannels have a maximum depth in a range of about 10% to about 80% of a thickness of the lens body.

32. A contact lens for use on an eye, the lens comprising:
a lens body having a posterior face, an anterior face spaced apart by a distance from the posterior face and configured to accommodate movement of an eyelid over the entire anterior face of the lens body when the contact lens is placed on an eye, a thickness defined as the distance between the posterior face and the anterior face, a curved peripheral portion of the posterior face surrounding an optical zone, and a a circular outermost perimeter;
a plurality of microchannels defined in the posterior face of the lens body and having a depth less than about 90% of the thickness of the lens body and having a maximum width less than about 500 microns, the microchannels extending from a peripheral edge of the lens body through a substantial portion of the curved peripheral portion towards the optical zone, the plurality of microchannels being sized and arranged to promote formation of a freely flowing tear film between a lens-eye interface when the lens is worn on the eye that is at least about 50% of the degree of flow of a free flowing tear film of an eye not associated with a contact lens.

33. The lens of claim 32 wherein the plurality of microchannels comprise radially extending microchannels.

34. The lens of claim 32 wherein the plurality of microchannels comprise microchannels spaced apart by between about 5 degrees and about 30 degrees.

35. The lens of claim 32 wherein the plurality of microchannels comprises equidistantly spaced apart microchannels, each microchannel having a width of less than about 5 degrees and a depth of between about 0.1 microns and about 50 microns.

36. The lens of claim 32 wherein the plurality of microchannels extend across the peripheral portion with an absence of microchannels within the optical zone.

37. The lens of claim 32 wherein the plurality of microchannels have a decreasing taper in terms of at least one of a width and a depth of the plurality of microchannels.

38. The lens of claim 32 wherein the plurality of microchannels comprise about 10 to about 100 microchannels.

39. The lens of claim 32 wherein the plurality of microchannels comprise microchannels having a maximum width in a range of about 50 microns to about 500 microns.

40. The lens of claim 32 wherein the microchannels have a maximum depth in a range of about 10% to about 80% of a thickness of the lens body.

41. A contact lens for use on an eye, the lens comprising:
a lens body having a posterior face, an optical zone, a peripheral portion and a peripheral edge;
a plurality of radially extending microchannels defined in the posterior face of the lens body and having a depth less than about 90% of a thickness of the lens body and having a maximum width less than about 500 microns, the microchannels sized and adapted to promote effective tear fluid exchange between an exposed surface of the eye and a surface of the eye covered by the lens body without substantially interfering with optical zone function, wherein the plurality of microchannels include first microchannels which are defined only in the peripheral portion and second microchannels which are defined at least partially in the optical zone.

42. The lens of claim 41 wherein the second microchannels are longer than the first microchannels.

43. A contact lens for use on an eye, the lens comprising:
a lens body having an optical zone, a posterior face including a first annular portion, a second annular portion circumscribing the first annular portion, and a peripheral edge circumscribing the second annular portion;
a first set of microchannels defined within the first annular portion of the posterior face and extending outward from an edge of the optical zone toward the peripheral edge, the first set of microchannels having a depth less than about 90% of a thickness of the lens body and having a maximum width less than about 500 microns; and a second set of microchannels defined within the second annular portion of the posterior face and having a depth less than about 90% of a thickness of the lens body and having a maximum width less than about 500 microns, wherein the first set and the second set are in fluid communication with one another.

44. The lens of claim 19 wherein there is an absence of microchannels in the optical zone.

45. The lens of claim 1, wherein the microchannels terminate in the peripheral portion of the lens body.

46. The lens of claim 1, wherein the microchannels extend to the optical zone of the lens body.

47. The lens of claim 1, wherein the microchannels extend into the optical zone of the lens body.

* * * * *